United States Patent
Hoffman et al.

(10) Patent No.: US 6,922,234 B2
(45) Date of Patent: Jul. 26, 2005

(54) METHOD AND APPARATUS FOR GENERATING STRUCTURAL DATA FROM LASER REFLECTANCE IMAGES

(75) Inventors: Eric Hoffman, Liberty, PA (US); Fred M. Persi, Aliquippa, PA (US)

(73) Assignee: Quantapoint, Inc., Pittsburgh, PA (US)

( * ) Notice: Subject to any disclaimer, the term of this patent is extended or adjusted under 35 U.S.C. 154(b) by 0 days.

(21) Appl. No.: 10/054,333

(22) Filed: Jan. 23, 2002

(65) Prior Publication Data

US 2003/0137646 A1 Jul. 24, 2003

(51) Int. Cl.[7] .............................. G01B 11/26; G01C 3/08
(52) U.S. Cl. .................... 356/141.1; 356/5.01; 702/159
(58) Field of Search .............................. 356/141.1, 5.01; 702/159

(56) References Cited

U.S. PATENT DOCUMENTS

| | | | | |
|---|---|---|---|---|
| 5,114,226 A | * | 5/1992 | Goodwin et al. | |
| 5,337,149 A | * | 8/1994 | Kozah et al. | |
| 5,531,520 A | * | 7/1996 | Grimson et al. | |
| 5,638,164 A | * | 6/1997 | Landau | 356/5.01 |
| 5,892,575 A | * | 4/1999 | Marino | 356/5.01 |
| 6,034,803 A | * | 3/2000 | Sullivan et al. | |
| 6,330,523 B1 | * | 12/2001 | Kacyra et al. | 702/159 |
| 6,473,166 B1 | * | 10/2002 | Ohishi et al. | 356/141.1 |

OTHER PUBLICATIONS

3rd Tech, Inc., "DeltaSphere™–3000 Laser 3D Scene Digitizer," Jun. 2000 Sales Brochure.

* cited by examiner

*Primary Examiner*—Thomas H. Tarcza
*Assistant Examiner*—Brian Andrea
(74) *Attorney, Agent, or Firm*—Ansel M. Schwartz

(57) ABSTRACT

An apparatus for generating structural data of a structure. The apparatus includes a scanning laser range finder that produces reflectance data of the structure. The apparatus includes a memory which stores the reflectance data. The apparatus includes means for determining desired spatial relationships of the structure from the reflectance data. A method for generating structural data of a structure. The method includes the steps of producing reflectance data of the structure with a scanning laser range finder. There is the step of storing the reflectance data in a memory. There is the step of determining desired spatial relationships of the structure from the reflectance data.

15 Claims, 4 Drawing Sheets

METHOD AND APPARATUS FOR GENERATING STRUCTURAL DATA FROM LASER REFLECTANCE IMAGES

FIELD OF THE INVENTION

The present invention relates generally to a method and apparatus used to document the spatial relationships and geometry of existing buildings and structures. Specifically, the present invention relates to a method and apparatus comprising a 3D camera (scanning laser range finder) which can produce high resolution reflectance images, a magnetic storage device which can store scanned measurement data, a set of algorithms which are used to interpret the measurement data, and a software interface which allows a human to interact and query the measurement information in useful ways.

BACKGROUND OF THE INVENTION

Revamp work is a significant portion of factory and plant engineering activities. Factories and plants are constantly updating processes and revamping production practices to meet new product demands, EPA regulations, and to replace worn out equipment. As a result, architects and engineering firms have to design equipment that can interface with existing plant conditions. For example, a new process may require interfacing with hundreds or even thousands of existing pipe runs. In order to design the equipment—primarily piping—measurements must be made of the existing factory or plant.

Existing design drawings are not good enough for this task for three primary reasons:
1. They cannot be found or do not exist due to poor record keeping
2. The drawings are pre-CAD and all measurements must be manually interpreted
3. The plant construction does not match the design to the tolerances required for the refit work.

Measuring the existing conditions of an operating plant is considered to be:
1. Dangerous. The plant cannot be shut down for measurement work so dangerous conditions exist ranging from moving equipment to hot equipment to exposure to caustic substances. In addition, much of what must be measured is high in the air or otherwise inaccessible.
2. Expensive. Field measurement requires sending a crew of workers to the site for an extended period of time. This is expensive due to man-hour costs on site, lost productivity, travel and lodging expenses, and costs of labor associated with plant personnel required for escort functions.
3. Slow. Current measurement techniques are measured in units of weeks and months. This can seriously impact production schedules. Each day a plant is not operating represents lost production capacity that can never be recovered, and lost profits that can never be realized.
4. Inaccurate. Mistakes in measurement, or the inability to measure parts of the plant, account for serious costs in construction change orders and rework.

Existing techniques for performing as-built measurement include manual methods using tape measures and plumb bobs, traditional survey techniques, photogrammetry (which is metrology using stereo photograph pairs—often used in aerial surveying and more recently used for process plant measurement), and most recently laser measurement using scanned laser radar systems.

Manual techniques are extremely slow, cumbersome, and dangerous due to needs for hands-on measurement. They are also subject to error and cannot reliably deliver the accuracy required by the engineering profession (+/−¼ inch). Manual techniques for our purposes comprise those techniques which employ traditional measurement tools including tape measures, plumb bobs, rules, and sketch pads.

Traditional survey techniques are useful for ground-based structures but are slow and require a very specialized work process to achieve good results. In addition, the number of data points that can be affordably measured is very small due to the labor-intensive nature of the techniques. Errors can be hard to detect but can drastically influence the outcome due to the small amounts of data gathered. For the purpose of this document, traditional survey techniques comprise the set of techniques that utilize theodolites, laser total stations, retro-reflective targets, and other support equipment that is commonly used by industrial and land surveyors.

Photogrammetry can be more accurate than manual methods and more comprehensive than traditional survey techniques but is very slow and cumbersome. This technique utilizes registered pairs of photographs to triangulate distances from the cameras to points on the surfaces of the plant structures. Photogrammetry relies on an accurate traditional ground survey in order to develop scale, and takes weeks to months for post data collection processing to produce useable results.

Laser radar (also called lidar) is the newest measurement technique to be applied to plant measurement. With this technique a laser is scanned across a volume of space and distances to the surfaces of objects are computed based on the properties of the returning laser beam. Typically the set of points generated by the lidar device is processed using mathematical algorithms into models that can be utilized by traditional CAD software.

The present invention is comprised of a lidar device but with unique properties that enable useful structural data to be generated faster and with a completely different paradigm than other lidar systems.

SUMMARY OF THE INVENTION

The present invention pertains to an apparatus for generating structural data of a structure. The apparatus comprises a scanning laser range finder that produces reflectance data of the structure. The apparatus comprises a memory which stores the reflectance data. The apparatus comprises means for determining desired spatial relationships of the structure from the reflectance data.

The present invention pertains to a method for generating structural data of a structure. The method comprises the steps of producing reflectance data of the structure with a scanning laser range finder. There is the step of storing the reflectance data in a memory. There is the step of determining desired spatial relationships of the structure from the reflectance data.

The present invention is a system for generating structural data from laser reflectance images. By structural data it is meant spatial measurements of built environments including but not limited to: distance between two discrete points, diameter of pipes, size of structural steel, distance between pipe centers, direction and orientation of pipe runs, distance to center of pipe flanges, distance between walls or between floors and ceilings, and the location and orientation of planar surfaces.

A scanning laser camera collects data and generates both a point cloud and a high-resolution reflectance image simultaneously. The reflectance image is loaded into a software interface that allows a human operator to query the data to determine the types of measurement data as listed above. Manipulation by the human operator of the 3D point data is not required to generate the information which leads to faster operation, lower demands on computing resources, and less cost to generate required information.

The present invention is unique in that it works exclusively with a 2D representation of a 3D database. All of the measurement functions currently requiring teams of field personnel to accomplish can be done in a fraction of the time in the comfort of a home office. The data will be more complete and more accurate and can be manipulated easily with workers unskilled in 3D data manipulation. The speed of useful data extraction will be orders of magnitude faster than any other technique both because of the high-speed 3D camera used to collect the data and because there is no need to generate a 3D solid based CAD model from which to generate measurements—as is typically done with 3D point data. This last point will save weeks of work on a typical job and will make viable a whole new class of applications which heretofore could not afford to employ advanced measurement techniques. Overall the benefits of the present invention will result in lower engineering costs, lower construction costs, and a US industrial base that will have a more accurate, better-documented infrastructure.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
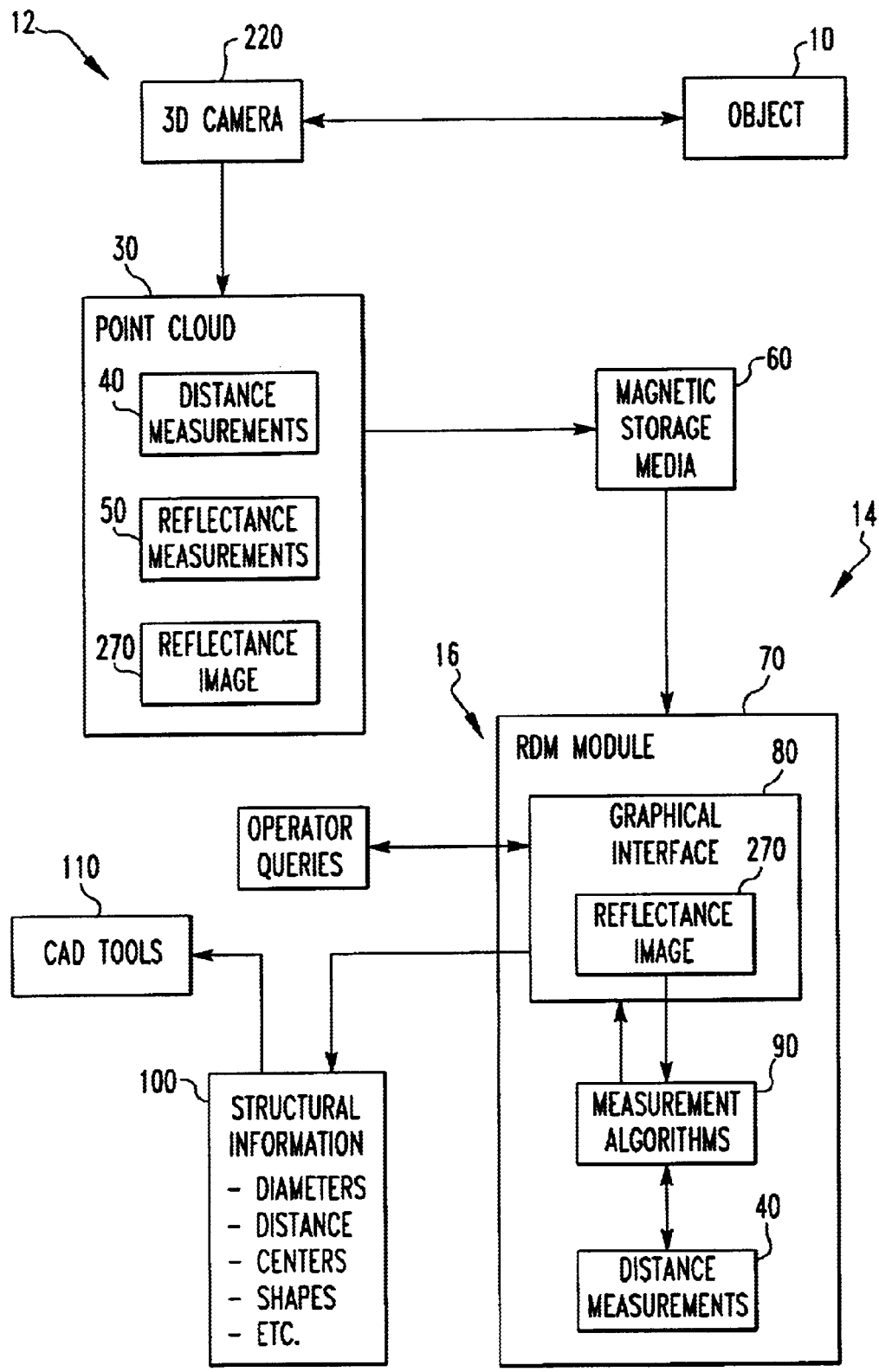
FIG. 1 is a block diagram of the system in accordance with an embodiment of the invention.

Referring now to the drawings wherein like reference numerals refer to similar or identical parts throughout the several views, and more specifically to FIG. 1 thereof, there is shown an apparatus for generating structural data of a structure. The apparatus 12 comprises a scanning laser range finder 220 that produces reflectance data of the structure. The apparatus 12 comprises a memory 60 which stores the reflectance data. The apparatus 12 comprises means 14 for determining desired spatial relationships of the structure from the reflectance data.

Preferably, the determining means 14 includes interface means 16, such as a key board, for allowing desired spatial relationships to be chosen. The data preferably includes a reflectance image 270 and a point cloud 30 of the structure that are produced simultaneously by the laser range finder 220. Preferably, the reflectance image is provided to the interface means 16 which allows a user to work with the reflectance image that is a 2D representation of the point cloud 30 which is a 3D representation of the structure. The data preferably includes distance measurements 40 and reflectance measurements 50 of the structure that have a direct correspondence. The reflectance image can be formed from reflectance measurements and range data.

The determining means 14 preferably determines a location of a discrete point in absolute coordinates of the structure; or distances between two discrete locations of the structure; or perpendicular and straight line distances between two edges in the structure; or diameters, centerlines and orientations of pipes in the structure; or perpendicular distances between pipe centerlines of the structure; or dimensions of structural elements; or nominal or standard sizes of components of the structure; or dimensions of flanges, nozzles and other pipe connections of the structure; distances between two planes of the structure; or 2D area measurements of the structure; or 3D volume measurements of the structure; measurements of multiple reflectance images of the structure; or location and orientation of planar surfaces of the structure.

The present invention pertains to a method for generating structural data of a structure. The method comprises the steps of producing reflectance data of the structure with a scanning laser range finder 220. There is the step of storing the reflectance data in a memory 60. There is the step of determining desired spatial relationships of the structure from the reflectance data.

Preferably, the determining step includes the step of choosing desired spatial relationships. The producing step preferably includes the step of producing a reflectance image 270 and a point cloud 30 of the structure simultaneously by the laser range finder 220. Preferably, the choosing step includes the step of providing the reflectance image to an interface means which allows a user to work with the reflectance image that is a 2D representation of the point cloud 30 which is a 3D representation of the structure. The data preferably includes distance measurements and reflectance measurements of the structure that have a direct correspondence. Preferably, the producing the reflectance image step includes the step of forming the reflectance image from reflectance measurements and range data.

In the operation of the invention, FIG. 1 is a block diagram that illustrates the invention in its broadest aspect. Referring to FIG. 1, a 3D camera 20 senses the position in three-dimensional space to points on an object(s) 10 generating a point cloud 30 consisting of both distance measurements 40 and reflectance measurements 50 of the object(s) 10.

The point cloud 30 is stored on a magnetic media 60 for use by the determining means 14, such as a Reflectance Display & Measurement (RDM) module 70.

The reflectance measurements 50 are processed into a reflectance image 270. The reflectance image 270 is stored on a magnetic media 60 for used by the RDM module 70.

The RDM module 70 loads the point cloud 30 from the magnetic media 60 into a Graphical Interface 80. Interacting with the reflectance image 270 generates requests for structural information 100. A direct correspondence between the reflectance measurements 50 and the distance measurements 40 allows the measurement algorithm module 90 of the RDM module 70 to generate geometric relationships using the entire point cloud 30.

The calculated structural information 100 (distances between points, pipe diameters, center distances, etc.) is displayed in the Graphical Interface 80 but alternately can be stored on a magnetic media 60 or used as input to conventional CAD tools 110.

Figure 2:
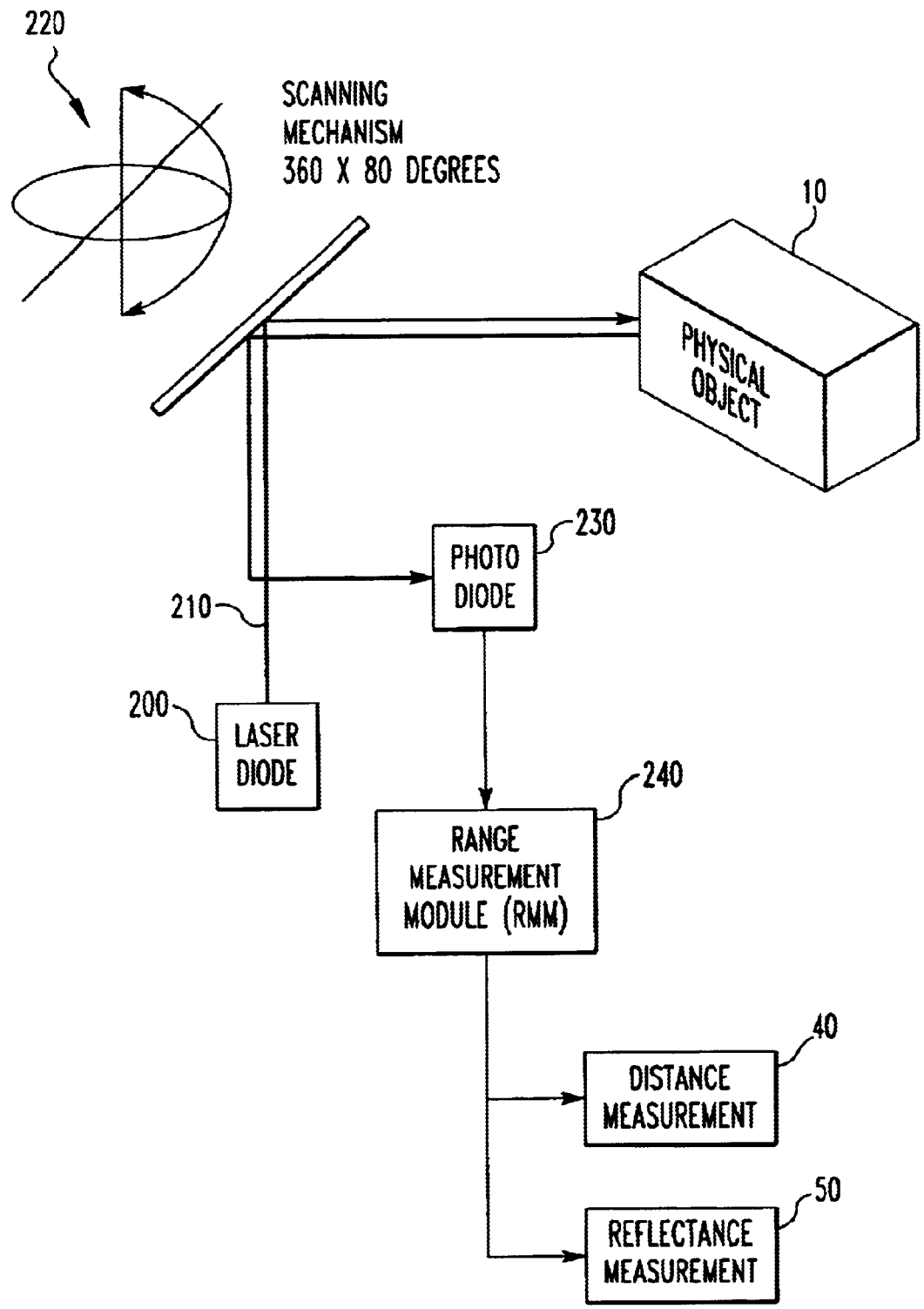
FIG. 2 is a block diagram that illustrates one embodiment of a three-dimensional camera.

FIG. 2 is a block diagram that illustrates the governing principles of one embodiment of the 3D camera. Also refer to U.S. Pat. No. 6,034,803, incorporated by reference herein. Referring to FIG. 2, a laser diode 200 is used to produce a continuous beam of energy 210. The energy is steered through a continuous 360-degree azimuth angle and an 80-degree vertical elevation angle to completely cover the object(s) 10 using a scanning mechanism 220 described in U.S. Pat. No. 6,034,803. The energy is reflected off of the object(s) 10 and is returned through the scanning mechanism 220 where it is sampled by a photodiode 230. A Range Measurement Module (RMM) 240 converts the sampled energy into a distance measurement 40 and a reflectance measurement 50. The distance measurement 40 is expressed in spherical coordinates and comprises the azimuth angle, zenith angle, and distance to a point on an object from the zero point of the camera. The zero point of the camera is located at the geometric center of the scanning mirror surface. The reflectance measurement 50 represents the amount of energy contained in the reflected energy used to generate the distance measurement 40.

The 3D camera used in this embodiment of the invention is manufactured by Quantapoint, Inc. and operates at a high speed producing 125,000 discrete data points every second. This high rate of data capture allows measurements to be spatially very dense while still producing enough volume coverage per unit time to be a commercially viable measurement device. Because of the high spatial density, the resulting reflectance measurements 50 can be formatted using industry standard file formats (such as TIFF or JPEG) into a reflectance image 270 that can be viewed similar to a traditional photograph. The reflectance image 270 can be viewed as a gray-scale image where each pixel element of the image corresponds uniquely to a distance measurement 40. In this embodiment of the invention, each reflectance measurement 50 captured by the 3D camera is 16 bits wide. When displayed to an operator, the reflectance image 270 data is compressed to 8 bits using a JPEG format to reduce computational load.

The raw intensity data is seldom suitable for detailed work because it is not optimized for operator viewing. Since the invention produces images using an internal source of illumination, the raw images show great contrast between near and far regions. This contrast unnecessarily confuses the image and makes it difficult to work with, especially in comparison with photographs taken with external illumination.

Using the following mathematical correction model for the generation of viewable images:

$$R_{xy}=V(I(i_{xy})*B(r_{xy})), \quad (A)$$

Where
$r_{xy}$=Physical range observed from pixel (x, y),
$i_{xy}$=Physical intensity observed from pixel (x, y),
B(r)="Boost" correction factor,
I(i)=Intensity correction factor,
R=Final reflectance value,
V=Overall transfer function.

The boost function B compensates for the falloff of intensity as a function of range. Theoretical simulations indicate that B is determined by the geometry of the lensing system within the laser acquisition module as well as the $(1/r^2)$ drop due to viewing distance. It is simplest to determine B by interpolating direct measurements at periodic intervals throughout the operating range of the device according to the following procedure:

1) Place a target of consistent reflectance at a known distance from the 3D camera.
2) Determine the raw intensity measured at this distance.
3) Repeat steps 1 & 2 every few meters over the useful range of the device, generating a set of ordered pairs, $\{(r_n, i_n)\}$.
4) Approximate $B(r_n)=(i_0/i_n)$.
5) Determine B for all other ranges via interpolation or curve fit.

The intensity correction factor is determined similarly, using multiple targets of varying (but known) reflectance at a fixed distance. The overall transfer function V is inserted to provide a mechanism to enhance the image after corrections for distance and hardware have been applied. In practice, the boost and intensity correction factors and the overall transfer function V are implemented using lookup tables.

A second embodiment currently in use is creation of a displayable reflectance image 270 using the TIFF graphics format. Additional industry standard and nonstandard formats can be used with no difference in operation to the fundamental concepts encapsulated in the present invention.

A third embodiment of the reflectance image 270 involves merging the reflectance measurements 50 with color intensity data 280 captured by a traditional or digital photographic camera. The resulting image is a colorized reflectance image 290 and is displayed in the same industry standard formats as the gray-scale images.

Collectively, the distance measurements 40 and the reflectance measurements 50 create a point cloud 30. Each point in the point cloud 30 corresponds exactly to one point in the reflectance image 270.

Other embodiments of a 3D camera can be used with the present invention assuming that the other embodiments include an ability to generate spatially dense distance data, reflectance measurements 50, and a known correspondence between the 2D reflectance data and the 3D distance measurement data.

In the first embodiment of the present invention, the magnetic media is comprised of an industry standard hard drive that is connected to the 3D camera via a SCSI bus. Alternate bus schemes can also be used without any change in the core invention. These can include Ethernet, parallel, Firewire, or any other bus architecture that can move binary data from a computing module to a magnetic storage medium. The hard drive stores distance measurements 40 and reflectance measurements 50 in a binary data file.

When an operator requests data in the RDM module, the binary data file is copied from the magnetic media to the RAM resident on the PC running the RDM module, typically through an Ethernet link, but also through a local bus resident on the PC if the data is stored on a local hard drive as opposed to a networked hard drive.

In a second embodiment of the invention, only the reflectance component of the data is loaded into the RDM module. When an operator requests a measurement of an object, only the relevant distance measurement data is loaded from the magnetic media to the PC RAM to perform the calculation or satisfy the query. The second embodiment allows for more efficient usage of computing resources than the first embodiment.

Figure 3:
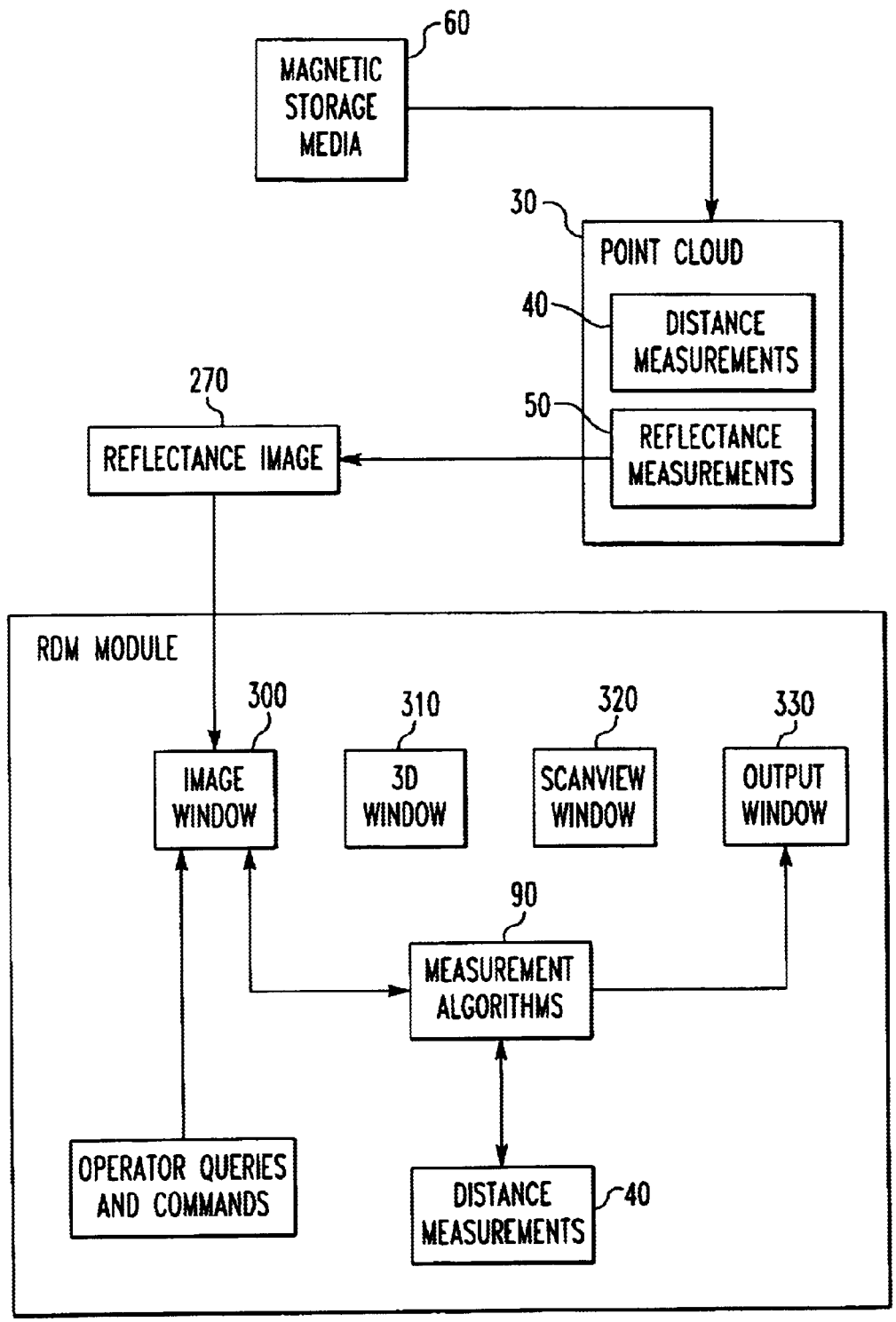
FIG. 3 is a block diagram illustrating the RDM module in its broadest aspect.
Figure 4:
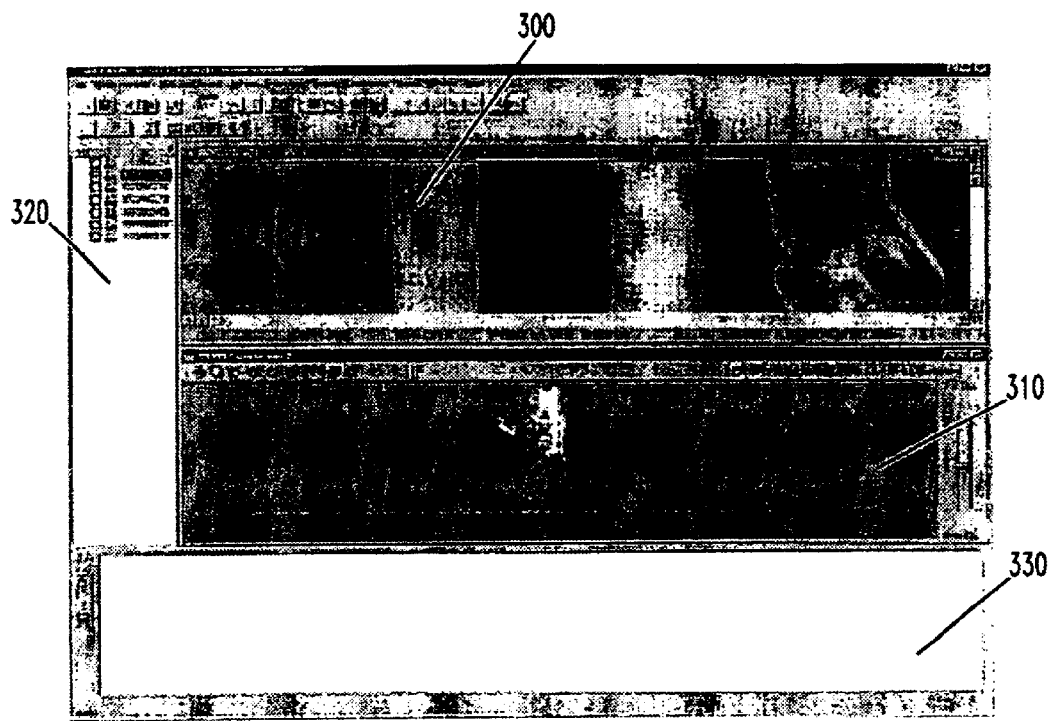
FIG. 4 is a screen shot showing the first embodiment of the RDM module.
Figure 5:
FIG. 5 is a screen shot showing a detail of the image window with a reflectance image loaded.

FIG. 3 is a block diagram of the RDM module in its broadest aspect. Referring to FIG. 3, a point cloud 30, comprising 3D measurement data 40 and reflectance data 50, is loaded into a Microsoft Windows compatible software interface from a magnetic storage media 60. A Graphical User Interface (GUI) comprising a set of windows, buttons, and controls, allows a human operator to interact with the point cloud through the reflectance image 270. The reflectance image 270 is loaded into an image window 300 and an operator generates queries into the data set by interacting with a set of icons and windowing commands. Queries from the operator can include, but are not limited to:

Location of a discrete point in absolute coordinates (example: the location in feet from the plant origin of the north-west corner of a pump housing)

Distances between two discrete locations in the scene (example: the distance between a valve and a flange in inches)

Perpendicular and straight line distances between two edges

Diameters, centerlines, and orientation of pipes

Perpendicular distances between pipe centerlines

Dimensions of structural elements (I, C, T, L, and square sections)

Nominal or standard sizes of components (example: find the nominal production size of a pipe in the scene rather than the actual size—a 6 inch pipe actually measures 6.625 inches in the OD but would be reported to the operator as a 6" pipe as this is the standard nomenclature)

Dimensions of flanges, nozzles, and other pipe connections

Perpendicular distance between two planes 2D area measurements (example: given a tank, compute the cross sectional area of the tank)

3D volume measurements (example: given a tank, compute the volume of the tank)

Measurements of all of the above across multiple reflectance images

Location and orientation of planar surfaces

Operator queries are processed by referencing the distance measurements 40 from the reflectance images 270. Applying a set of measurement algorithms 90 to the point cloud distance measurements 40 generates the specific geometric data requested by the operator. The result of the query is displayed in an output window 310 or is stored in a file on a magnetic storage media 60.

The current embodiment of the RDM 70 is comprised of 4 individual windows: Image Window 300, 3D window 310, ScanView window 320, and the Output window 330. In addition a series of pull down menus allows the user to load files, exit the program, select preferences and options, and select controls for making data queries.

The Image Window 300 is a display window for the reflectance image 270. The reflectance image 270 is loaded into the Image Window 300 by the RDM 70 from the magnetic storage media 60. The reflectance image 270 appears to the operator as a gray-scale image that can be panned and zoomed. Controls are provided in the RDM 70 so that the operator can adjust the contrast, brightness, and gamma correction of the reflectance image 270 to enhance the viewing of the image when image quality is not sufficient for the operator's needs. The operator performs all measurement functions by interacting with the Image Window 300.

The 3D Window 310 is a display window for the point cloud 30. The 3D window 310 is not required for the present invention however it is a useful display so that an operator can review and check the point cloud 30.

The ScanView Window 320 is a display window containing a list of the available 3D camera 20 positions or scans. The scans can be loaded into the RDM 70 by double-clicking on the scan name. Right clicking on the scan name allows the operator to set parameters concerning the particular scan such as range bounds, display color, and display position. Scans can be grouped into a hierarchical structure or displayed individually.

The Output Window 330 is a data display window that shows the results of operator queries. The Output Window 330 contains controls that allow the operator to change the system of dimensional units used for display. The current embodiment of the invention allows display of results in meters, decimal feet, and feet and inches. Other embodiments could display any other measurement units system appropriate for the task. The contents of the Output Window 330 can be saved to a magnetic storage media 60 for export to CAD tools 110.

An operator can determine the location of a discrete point in three-dimensional space by selecting the Pick Point icon on the Measurement Toolbar of the RDM 70. After the Pick Point icon is selected by the operator, a location is selected by the operator in the Image Window 300 that corresponds to the point of interest. The RDM 70 uses the image coordinates selected by the operator as an index into the distance measurements 40. The result of the lookup is then converted to the operator selected units system and is then written to the Output Window 330 for display to the operator.

Schematically, there is $$(i, j) \to (r, I, y, n) \to (d, \text{azimuth, zenith, } I') \to (x, y, z, I') \to (X, Y, Z, I'),$$

Where

| | |
|---|---|
| (i, j) | pixel indices, |
| r | raw range measured by laser to imaged spot, |
| I | raw intensity measured by laser to imaged spot, |
| y | raw encoder value for mirror's yoke position, |
| n | raw encoder value for mirror's nod position, |
| d | Distance from center of scanner to imaged spot, |
| Azimuth | Azimuth angle to imaged spot from scanner origin, |
| Zenith | Zenith angle to imaged spot from scanner origin, |
| I' | Corrected intensity from equation (A) above, |
| x,y,z | Cartesian coordinates in the coordinate system local to the scanner, |
| X,Y,Z | Cartesian coordinates in the world coordinate system. |

The progression is from raw values, through calibrated values, and finally on to world or user coordinates.

The first ordered pair, (i, j) is selected as the user interacts with the Image Window 300. The second ordered quadruple is raw data as sent by the scanner and stored on magnetic media in a file. The first two, r and I, are respectively range and intensity measured by the laser system. The latter two, y and n, are encoder values read directly from the positioning of the mirror.

The next set consists of calibrated data. The intensity is calibrated via equation (A). Since the laser produces calibrated data already, all that remains is to subtract the offset distance from the laser zero-point to the scanner zero-point at the center of the mirror. That is, $d = r - r_0$.

For the angles, a more complicated scheme is employed:

$$\text{Azimuth} = \lambda y + A_0 + A_1 \sin(\lambda y + \alpha),$$

$$\text{Elevation} = E_0 + -2\lambda n + B \sin(\lambda n + \beta) + C \sin(\lambda y + \delta)$$

In these equations the raw, measured quantities are $$\lambda n = \text{nod Angle} = (\text{nod encoder count}) \times (\text{nod resolution}),$$

$$\lambda y = \text{yoke Angle} = (\text{yoke encoder count}) \times (\text{yoke resolution}).$$

The set of calibration parameters $A_0$, $A_1$, $\alpha$, $E_0$, $B$, $\beta$, $C$, and $\delta$ are determined according to our calibration process prior to the field scanning.

Once the calibrated polar data has been determined, it is simple to construct the Cartesian values via the usual formula:

$$x = d \cos(\text{azimuth}) \sin(\text{zenith}),$$

$$y = d \sin(\text{azimuth}) \sin(\text{zenith}),$$

$$z = d \cos(\text{zenith}).$$

The world coordinates may be determined from these local coordinates, viz.:

$$(X, Y, Z)^\sim T = R((x,y,z)^\sim T) + t,$$

Here '~T' denotes transposition and
R=the matrix that rotates from scanner local into world coordinates,
t=the (world) location of the scanner origin.

The calibration parameters are stored in a header section at the beginning of the raw data file, and the (R, t) transformation information is stored within an auxiliary control file.

An operator can measure the relative distance between two points in three-dimensional space by selecting the Measure Distance icon on the Measurement Toolbar of the RDM 70. After the operator selects the Measure Distance icon, a first location is selected in the Image Window 300. After the first location is selected, the operator selects a second location by moving the mouse pointer over the Image Window to the location of the end point of the measurement.

For each location selected, the three-dimensional location in space is determined from the correlation between the reflectance image 270 and the distance measurements 40. Initially the coordinate information for each location is computed relative to the local coordinates of the 3D camera 20 but is subsequently transformed into world coordinates using the location and orientation parameters for the corresponding 3D camera 20 position. Differences are computed for the x-coordinates, y-coordinates, and z-coordinates. The absolute distance between the specified points is computed using the Pythagorean theorem. Mathematically, we have Given 3-vectors p and q, where p=first picked point, in coordinate system local to 3D camera location P,
q=second picked point, relative to coordinate system local to 3D camera location Q,
we compute $$^Wp = R_P(p) + t_P, \text{ and } {^Wq} = R_Q(q) + t_Q.$$

Then $$^WD = {^Wp} - {^Wq}.$$

The 'delta-difference' values are then the ordered triple $^WD = (D_x, D_y, D_z)$ with the total, or absolute distance given by $$|D| = \sqrt{(D_x^2 + D_y^2 + D_z^2)}.$$

The pre-superscript 'W' denotes quantities in the world coordinate frame. The transformation from local scan coordinates to world coordinates is accomplished via a rotation R followed by a translation t. It is possible to have two different transforms if the points are selected from different 3D camera locations.

The results of the measurement calculations are then converted to the operator-selected units system and are written to the Output Window 330 for display to the operator.

An operator can measure the relative distance between two edges in three-dimensional space by selecting the Measure Edge icon on the Measurement Toolbar of the RDM 70. After the operator selects the Measure Edge icon, a first edge is selected in the Image Window 300. After the first edge is selected, the operator selects a second edge by moving the mouse pointer over the Image Window 300 to the location of second edge.

The selection cursor for measuring between two edges is comprised of a box. The operator need only include the edge somewhere within the area of the box. A calculation is performed to generate the actual location of the edge at accuracy greater than a single pixel.

The single-edge extraction algorithm operates on the distance measurements 30 that correspond to the reflectance image 270 pixels within the box. For each pixel row in the selection box, the discontinuity point is determined by looking for jumps in the distance measurements 30 greater than a specified, configurable threshold (10 cm default.) For each pixel row the last valid pixel location before the discontinuity is stored.

After all pixel rows within the selection box have been similarly processed, the best-fit line passing through the stored pixel locations is determined using a linear least-squares technique:

First, outlier points are filtered from those pixels selected in the Image Window 300. The remaining points are averaged. The following matrix is constructed:

$$M = \Sigma (p_i - c)^T (p_i - c),$$

Where
$p_i$=3D coordinate of the reflectance image pixel in question, and
c=Arithmetic average of all remaining pixel locations.

The sum is performed over all stored pixels. The direction of the line representing the edge is chosen as the eigenvector corresponding to the minimum eigenvalue of the matrix M. Taking the vector c as a point on the line completes the specification of the edge in 3-space. The second edge is determined in identical fashion.

In the following discussion, the first edge selected will be referred to as the 'reference edge' and the second edge will be referred to as the 'query edge.' The perpendicular distance between the two computed edges is measured relative to the three-dimensional location of the reference edge. However, since it is not generally true that the reference edge and the query edge are parallel, the distance is measured from the query edge to a special point on the reference edge, called the reference point. The reference point is that point on the line comprising the reference edge that is closest to the center reflectance image pixel in the selection box used to establish the reference edge.

If the two edges have orientations more that 10° apart, the operator is warned and the calculation is discontinued. The cutoff value of 10° is not fixed and may be changed by the operator.

The center distance between the two edges is computed as the distance from the reference point to the query edge. Note that in the case whereby the reference edge and the query edge are truly parallel this distance is equal to the parallel-line distance between the two edges.

The results of the edge measurement calculations are then converted to the operator-selected units system and are written to the Output Window 330 for display to the operator.

An operator can measure the diameter of a pipe by selecting the Measure Pipe icon on the Measurement Toolbar of the RDM 70. There are currently two embodiments of pipe diameter measurement.

In the first embodiment of pipe diameter measurement, the Measure Pipe icon requires the operator to select the orientation of the pipe (north-south, east-west, vertical). The operator then selects a region of the pipe in the Image Window 300 using a dragged selection box. Alternately the operator can select a region using a fence method.

The distance measurements 40 that correspond to the reflectance image 270 pixels within the selection box are projected onto the 2D plane perpendicular to the pipe orientation that has been selected by the operator. A nonlinear least-squares algorithm then solves for the best-fit circle that passes through the distance measurements selected. The algorithm uses a Levenberg-Marquardt technique with kernel function $$E(R, C) = \Sigma(|P_i - C| - R)^2.$$

Where
R=radius of the circle,
C=circle origin in 2D coordinate frame, and
$P_i$=the 2D projected coordinates of the $i^{th}$ distance measurement.

The sum is taken over all selected distance measurements. The initial value for the circle origin is taken as the average location of the contents of the selection box, and the initial radius is user-selectable but 30 cm works well as the default.

After convergence, the circle origin is converted back to three-dimensional world coordinates using the inverse of the initial transformation. The ambiguity in projecting from the lower-dimensional space into the higher-dimensional space means that the point is projected into a line. This ambiguity is resolved by choosing, for the circle origin, the point on the line closest to the arithmetic mean of the originally selected reflectance image pixels.

The pipe centerline is chosen as the line parallel to the operator-selected pipe orientation that passes through the circle origin. The pipe diameter is calculated as twice the circle radius R determined above. The results of the calculations are then converted to the operator-selected units system and are written to the Output Window 330 for display to the operator.

In the second embodiment of the pipe diameter measurement, the operator selects the Measure Pipe icon on the Measurement Toolbar then indicates a single point on the pipe of interest in the Image Window 300. In the second embodiment it is not necessary for the operator to select the pipe orientation or select a portion of the pipe with a selection box.

Initially, a small region surrounding the selected reflectance image pixel is examined for consistent distance measurements. If the distance measurements are not consistent, the operator is notified and the diameter calculation algorithm is aborted.

The initial region is chosen as a 5×5-pixel square surrounding the selected reflectance image pixel, though the actual size is operator configurable.

From the initial region an initial estimate of the pipe size, location, and orientation is determined using a Levenberg-Marquart algorithm appropriate for cylinders. The algorithm also provides error bounds on these parameters.

The first iteration of the Levenberg-Marquart algorithm examines all distance measurements 40 not previously considered that are adjacent to distance measurements 40 used thus far to compute the pipe parameter. Distance measurements 40 not within the parameter space of the initial pipe estimate—as delimited by the error bounds—are rejected. Those not rejected are used to refine the pipe parameters and errors on those parameters.

Subsequent iterations continue until no new points are found. The operator is informed if errors are not acceptable for the pipe parameters.

The results of the pipe diameter and centerline measurement calculations are then converted to the operator-selected units system and are written to the Output Window 330 for display to the operator.

An operator can measure the distance between the centers of two pipes by selecting the Measure Pipe Centers icon on the Measurement Toolbar of the RDM 70. The RDM assumes that the operator has generated the diameter measurement of the two pipes previously.

In the following discussion, the first pipe will be referred to as the 'reference pipe' and the second pipe will be referred to as the 'query pipe.' Perpendicular distances are measured relative to the reference pipe. However, since it is not generally true that the reference pipe and the query pipe are parallel, the distance is measured from the query pipe to a special point on the reference pipe, called the reference point. The reference point is that point on the centerline of the reference pipe that is closest to the initial reflectance image 270 pixel used to establish the reference pipe. If the reference pipe was established by selecting a region, the reference point is that point on the centerline of the reference pipe that is closest to the arithmetic average of the initial reflectance image 270 pixels used to establish the reference pipe.

If the two pipes have orientations more that 10° apart, the operator is warned and the calculation is discontinued. The cutoff value of 10° is not fixed and may be changed by the operator.

The center distance between the two pipes is computed as the distance from the reference point to the query pipe's centerline. Note that in the case whereby the reference pipe and the query pipe are truly parallel this center distance is equal to the parallel-line distance between the two pipes.

The results of the center distance measurement calculations are then converted to the operator-selected units system and are written to the Output Window 330 for display to the operator.

An operator can measure the centerline and dimensions of standard structural elements. The typical list of structural elements includes I-beams, T-beams, C-beams, L-beams and square/rectangular section beams. Important dimensions of these items include centerlines and flange and web dimensions. The operator can generate dimensions of structural elements by selecting the appropriate section shape on the Structural Elements tool bar on the Measurement Toolbar of the RDM 70. Once the operator selects the section shape icon they then select points on the desired element as instructed by a sequence of RDM prompts.

For example, to measure an I-beam the operator selects the I-Beam icon. The RDM 70 prompts the operator to select a point on the exterior face of the beam near an edge as represented by a pixel in the reflectance image 270. If this operation is successful, the operator is prompted to pick another point in the reflectance image 270 on the same face, but near the opposite edge. This second point should be at approximately the same longitudinal position as the first point. If the second operation succeeds, the operator is prompted for a final time to select a point in the reflectance image 270 on the opposite side of the I-beam, again near an edge. This last pick is in the interior of the beam (see diagram.) Other structural elements are done similarly. The table below lists the type of structural element with the requisite input values and computed output values.

After the initial identification of key features, the subsequent identification and measurement proceeds identically for all structural elements. First, straight edges are extracted for each picked point using the technique outlined for measuring between edges. A check is performed to guarantee that these edges are indeed parallel to within a few degrees (an adjustable parameter.) If the edges are not essentially parallel, the algorithm reports an error and aborts.

Next, a plane is constructed so as to be perpendicular to the weighted average of the directions of the straightedge lines. Mathematically the plane can be described using a normal N and distance d such that $$N \cdot x = D \text{ for all points } x \text{ lying within the plane.}$$

There is $$N = w_1 l_1 + w_2 l_2 + w_3 l_3 / (w1 + w2 + w3), \text{ and}$$

$$D = N \cdot (w_1 p_1 + w_2 p_2 + w_3 p_3),$$

Where the $w_i$ are the weight factors.

The points $p_1$, $p_2$ and $p_3$ are the original three pick-points and the corresponding straight edges are represented parametrically as $$L_i s + q_i,$$

With $L_i$ the (unit) direction vector of the line and $q_i$ a point on the line.

The plane is then intersected in turn with each of the lines to determine three 'control' points $C_i$ from which the measurements will be computed. Since the lines are almost parallel and the plane is approximately perpendicular to all the lines, this intersection is possible and can be determined by solving $$D = N \cdot (L_i s + q_i) = s(N \cdot L_i) + N \cdot q_i.$$

for s, and back-substituting to obtain the control point, viz.

$$S_i = (D - N \cdot q_i)/(N \cdot L_i)$$

so that $$C_i = L_i S_i + q_i.$$

The required dimensions are computed from appropriate pairs using the algorithm presented above for measuring distances between discrete points.

An operator can determine the nominal size of a structural component. This action is initiated by the operator selecting the Nominal Size preference before developing the measurement of a standard structural element as described above. Upon completion of the structural measurement calculation, the RDM 70 will compare the resulting dimensional information to a table stored in the RDM 70 of standard manufactured shapes and structural elements. If a close fit is found on the table, then the corresponding standard size is reported to the Output Window 330 along with the other dimensional information from the structural element measurement calculations.

For each type of element there exists a table of standard configurations for intrinsic parameters. The table is organized in dictionary order to facilitate searching. Once an element is identified and the intrinsic parameters are determined, a comparison is made with the relevant table. A weighting factor is assigned for each parameter. The entry that matches best and has the overall discrepancy less than 10% (an adjustable parameter) is reported to the operator by the RDM 70.

An operator can measure the center, surface plane, and orientation of a pipe flange or a nozzle by selecting the Measure Flange icon on the Measurement Toolbar of the RDM 70.

The operator is prompted to select pixels in the reflectance image 270 that correspond to the flat planar surface of the flange. At least 3 points are required but the operator may pick additional points for improved accuracy. These pixels are used to reference the distance measurements 40 that are used to determine a plane, using the best-fit plane algorithm described below. If the fit is inconsistent an error is displayed and the calculation is aborted.

The operator is then prompted to select several pixels in the reflectance image 270 running across the face of the flange. Two pixel locations on the portion of the flange closer to the initially picked plane are selected first, then two pixel locations on the other half of the flange are selected.

| Element | Input | Ouput |
| --- | --- | --- |
| I-beam | Three edges. The first two must be on the short end of the beam. The last edge is on the other side. A point on the interior web may be used to determine web thickness. | Orientation (vertical, north-south, east-west, other) Location in world coordinates Depth Width |
| T-beam | Three edges: On top-of-T end, on bottom-of-T end, and one at the junction point. | Orientation (vertical, north-south, east-west, other) Location in world coordinates Top length Height |
| C-beam | Two edges: one on each end of the 'C'. One point on the interior face. | Orientation (vertical, north-south, east-west, other) Location in world coordinates Depth Width |
| L-beam | Three edges: One on each end of the L and the third at the junction point. | Orientation (vertical, north-south, east-west, other) Location in world coordinates Depth Width |
| Rectangular-section beam | Three edges, in any order. | Orientation (vertical, north-south, east-west, other) Location in world coordinates Depth Width |

These four locations are sorted according to distance from the initial plane and therefore need not be picked in sequence. However, they must be along a line approximately parallel to the flange's centerline. The points nearest to the flange's face should be placed symmetrically about the face.

Using the algorithm outlined above for measuring the diameters of pipes, the diameter, location, and orientation of the centerline of the flange is determined. A best-fit line is constructed that passes through the four points picked across the flange face. The direction of this line is checked for consistency with the normal to the previously-computed surface plane. The two locations closest to the face of flange are averaged and projected onto the centerline to determine the operating center of the flange.

Denoting the centerline as $L_c s + q_c$ and the points as a and b, the projections are given by $$P_a = L_c (a-q_c) \cdot L_c + q_c, \text{ and}$$

$$P_b = L_c (b-q_c) \cdot L_c + q_c.$$

The results of the flange or nozzle measurement calculations are then converted to the operator-selected units system and are written to the Output Window for display to the operator.

An operator can measure the perpendicular distance between two planes by selecting the Measure Planes icon in the Measurement Toolbar of the RDM 70. The operator then selects two flat locations in the reflectance image 270 in the Image Window 300. The RDM 70 then generates a first plane by fitting the best plane to an array of distance measurements 40 that correspond to and surround the pixel selected at the first location in the Image Window 300. The distance measurements 40 are averaged. The following matrix is constructed:

$$M = \Sigma (p_i - c)^T (p_i - c),$$

Where $p_i$=3D coordinate of the distance measurement in question, and c=Arithmetic average of all remaining distance measurements.

The 'T' superscript denotes matrix transposition and the sum is performed over all selected distance measurements 40. The perpendicular to the plane generated is a vector proportional to the minimum eigenvalue of the matrix M. The normal is chosen to have unit length. The plane is fully specified by choosing c to lie within the plane.

The RDM 70 then generates a second plane by fitting the best plane to an array of distance measurements 40 that surround the reflectance image pixel selected at the second location in the Image Window 300.

In the following discussion, the first plane will be referred to as the 'reference plane and the second will be referred to as the 'query plane.' Perpendicular distances are measured relative to the reference plane. However, since it is not generally true that the reference plane and the query plane are parallel, the distance is measured from the query plane to a special point on the reference plane, called the reference point. The reference point is that point on the reference plane that is closest to the initial reflectance image 270 pixel used to establish the reference plane. If the reference plane was established by selecting a region, the reference point is that point on the reference plane that is closest to the arithmetic average of the initial reflectance image 270 pixels used to establish the reference plane.

If the two planes have orientations more that 10° apart, the operator is warned and the calculation is discontinued. The cutoff value of 10° is not fixed and may be changed by the operator.

The center distance between the two planes is computed as the distance from the reference point to the query plane. Note that in the case whereby the reference plane and the query plane are truly parallel this center distance is equal to the parallel-line distance between the two planes.

The perpendicular measurement between the two planes is then converted to the operator-selected units system and is written to the Output Window 330 for display to the operator. The relative orientation of the query plane relative to the reference plane is also reported to the operator.

An operator can measure areas of two-dimensional surfaces by selecting the Measure Area icon in the Measurement Toolbar of the RDM 70. In the Image Window 300 the operator places a fence or box about the reflectance image pixels of interest. The surface area is computed approximately using the distance measurements corresponding to the selected reflectance image pixels and knowledge of the angular resolution of the 3D camera 20 as $$S = A \Sigma r_i^2 \cos(\theta_i).$$

Where

A=Angular pixel size=(Azimuth resolution in radians)* (Elevation resolution in radians), $r_i$=Range to the $i^{th}$ pixel, and $\theta_i$=Elevation to the $i^{th}$ pixel.

The sum is taken over all pixels within the region of interest.

The area measurement is then converted to the operator-selected units system and is written to the Output Window 330 for display to the operator.

As a result of the 3D camera 40 positions being registered to a common coordinate origin, the measurement tools contained within the RDM 70 are also useable across multiple images. This feature allows measuring behind and through objects and over long distances. To use this capability the operator loads more than one reflectance image 270 into the RDM 70 at one time. Each additional reflectance image 270 is contained in its own Image Window 300. Selection operations area made between the multiple Image Windows.

Because of the aforementioned common registration, it is also possible to measure volumes within the RDM 70. After selecting the volume measurement tool the operator is prompted to select points on the border of the object to be measured. Using several different reflectance images 270, the operator picks sufficient points to create a three-dimensional outline of the volume to be measured. The convex hull of these exterior points is computed and the volume calculation follows directly.

Each measurement initiated by the operator in the RDM 70 is recorded in an internal memory buffer. A Measurement Window provides a list of currently active measurements. From this Measurement Window the operator can delete unneeded or obsolete measurements. In addition, the operator can notate each measurement with a text message of up to 256 characters.

This internal memory buffer may be saved in a variety of formats, including text (ASCII) and the industry-standard Drawing exchange Format, DXF. This latter format may be converted to other CAD representations as well including DWG and DGN.

The measurements, including annotations, may then be imported into a variety of CAD programs to facilitate the measurement and design processes.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. An apparatus for generating structural data of a structure comprising:

a scanning laser range finder which provides up to 125,000 discrete data points every second that produces reflectance data of the structure;

a memory which stores the reflectance data; and means for determining desired spatial relationships of the structure from the reflectance data.

2. An apparatus as described in claim 1 wherein the determining means includes interface means for allowing desired spatial relationships to be chosen.

3. An apparatus as described in claim 2 wherein the data includes a reflectance image and a point cloud of the structure that are produced simultaneously by the laser range finder.

4. An apparatus as described in claim 3 wherein the reflectance image is provided to the interface means which allows a user to work with the reflectance image that is a 2D representation of the point cloud which is a 3D representation of the structure.

5. An apparatus described in claim 4 wherein the data includes distance measurements and reflectance measurements of the structure that have a direct correspondence.

6. An apparatus as described in claim 5 wherein the reflectance image is formed from reflectance measurements and range data.

7. A method for generating structural data of a structure comprising the steps of:

loading a reflectance image into an image window;

selecting a first point of the structure in the image;

selecting a second point on the structure;

selecting a third point of the structure;

measuring edges with respect to the first point, second point and third point;

extracting straight edges for the first point, second point and third point;

constructing a plane so as to be perpendicular to an average of directions of lines defined by the straight edges;

intersecting the plane in turn with each of the lines to determine three control points; and computing dimensions with the three control points for measuring distances between discrete points on the structure.

8. A method as described in claim 7 wherein the constructing step includes the step of constructing a plane so as to be perpendicular to a weighted average of directions of the lines of the straight edges.

9. A method as described in claim 8 including the step of generating queries into a data set of the reflectance image.

10. A method as described in claim 9 wherein the selecting a first point step includes the step of selecting the first point on an exterior face near a first edge of the structure in the image.

11. A method as described in claim 10 wherein the generating queries step includes the step of generating queries into the data set of the reflectance image by interacting with a set of icons and windowing commands.

12. A method as described in claim 11 wherein the extracting step includes the step of checking that the straight edges are essentially parallel.

13. A method as described in claim 12 wherein the selecting the second point step includes the step of selecting the second point on the face near the second edge of opposite the first edge.

14. A method as described in claim 13 wherein the selecting a second point includes the step of selecting a second point at a same longitudinal position as the first point.

15. A method as described in claim 14 wherein the selecting the third point includes the step of selecting the third point on the structure on an opposite side of the exterior face of the structure near a third edge in the interior of the structure.

* * * * *